(12) United States Patent
Janarthanan et al.

(10) Patent No.: US 9,540,941 B2
(45) Date of Patent: Jan. 10, 2017

(54) INTERSTAGE SEAL ASSEMBLY FOR GAS TURBINE ENGINE

(71) Applicant: Siemens Energy, Inc., Orlando, FL (US)

(72) Inventors: Mahesh Janarthanan, Charlotte, NC (US); Jeffrey A. Kain, Oviedo, FL (US); Mushtaq Kazi, Orlando, FL (US)

(73) Assignee: Siemens Energy, Inc., Orlando, FL (US)

( * ) Notice: Subject to any disclaimer, the term of this patent is extended or adjusted under 35 U.S.C. 154(b) by 0 days.

(21) Appl. No.: 14/254,153

(22) Filed: Apr. 16, 2014

(65) Prior Publication Data

US 2015/0300189 A1    Oct. 22, 2015

(51) Int. Cl.
*F01D 11/02* (2006.01)
*F01D 11/00* (2006.01)
*F02C 7/28* (2006.01)

(52) U.S. Cl.
CPC ............... *F01D 11/001* (2013.01); *F02C 7/28* (2013.01); *F05D 2240/56* (2013.01)

(58) Field of Classification Search
CPC ......... F01D 11/001; F01D 11/02; F01D 11/08; F05D 2240/56; F16J 15/164; F16C 33/80; F02C 7/28
USPC ........................................................ 277/347
See application file for complete search history.

(56) References Cited

U.S. PATENT DOCUMENTS

| | | | | |
|---|---|---|---|---|
| 4,659,289 A | * | 4/1987 | Kalogeros | F01D 5/3015 415/173.7 |
| 5,401,036 A | * | 3/1995 | Basu | 277/355 |
| 5,630,590 A | * | 5/1997 | Bouchard et al. | 277/301 |
| 5,961,279 A | * | 10/1999 | Ingistov | F01D 11/001 277/412 |
| 6,220,814 B1 | * | 4/2001 | Brushwood | F01D 11/001 219/201 |
| 6,390,476 B1 | * | 5/2002 | Tong | F16J 15/442 277/355 |
| 6,517,314 B1 | | 2/2003 | Burnett et al. | |
| 6,622,490 B2 | | 9/2003 | Ingistov | |
| 6,854,736 B2 | | 2/2005 | Paprotna | |
| 7,192,246 B2 | | 3/2007 | Wright et al. | |

* cited by examiner

*Primary Examiner* — Kristina Fulton
*Assistant Examiner* — Nathan Cumar

(57) ABSTRACT

A seal assembly is provided for a turbine engine and includes an annular labyrinth seal holder supported on a radially inner end of vanes A plurality of radially extending labyrinth seal elements are supported on the labyrinth seal holder, and a brush seal assembly is supported to the labyrinth seal holder downstream from the labyrinth seal elements. The brush seal assembly includes a brush seal holder and a brush seal located adjacent to an axially rearward one of the rotor arms. The brush seal holder is attached to an axially facing surface of the labyrinth seal holder. A seal plate defining a detachable labyrinth seal element extends radially inward from the axially facing surface of the labyrinth seal holder to the rearward rotor arm at a location upstream of the brush seal.

12 Claims, 2 Drawing Sheets

INTERSTAGE SEAL ASSEMBLY FOR GAS TURBINE ENGINE

FIELD OF THE INVENTION

The present invention is generally related to seals for gas turbine engines and, more particularly, to a seal assembly in a multistage gas turbine engine for providing interstage leakage control.

BACKGROUND OF THE INVENTION

In a gas turbine, a gas is compressed through successive stages in a compressor and mixed with fuel in a combustor The combination of gas and fuel is then ignited for generating combustion gases that are directed to turbine stages to produce rotational motion The turbine stages and compressor stages typically have stationary or non-rotary components, e.g., vanes, that cooperate with rotatable components, e.g., rotor blades, for compressing and expanding the operational gases.

Any fluid leakage between stages reduces overall gas turbine engine performance and efficiency and therefore, interstage seals are provided to reduce such leakage. In general, fluid leakage is reduced when a gap between the seal and a rotor assembly is minimized. Labyrinth seals have been used to effect a seal between stages at different pressures in gas turbine engines. Such seals generally comprise two principal elements, i e, a rotating seal and a static seal The static seal, as viewed in cross section parallel to the axial length of the engine, frequently has rows of thin labyrinth fingers or teeth, typically formed of stainless steel, extending radially from a relatively thicker base The teeth of the static seal extend radially to a location adjacent the rotating seal. If contact occurs between the labyrinth teeth and the rotating seal, the stainless steel teeth may be deformed and/or deteriorate. Accordingly, labyrinth seals have generally been designed to allow sufficient clearance to avoid problems associated with contact between the labyrinth teeth and the adjacent seal surfaces, allowing a certain amount of leakage of secondary air flow.

It is an object of the present invention to provide a seal construction for a multistage rotary machine that can avoid or minimize damage that may occur as a result of contact between the rotating seal and the stationary seal, and that maintains an adequate seal between different pressure regions defined by the engine stages.

SUMMARY OF THE INVENTION

In accordance with an aspect of the invention, a seal assembly is provided for a turbine engine The turbine engine includes adjacent upstream and downstream rotating rotor disks supporting respective rows of blades, a row of stationary vanes located between the rows of blades, and an axially extending rotor arm supported on each of the rotor disks and located radially inward from the blades. The seal assembly comprises an annular labyrinth seal holder supported on a radially inner end of the vanes and having a radially inner surface and a downstream axially facing surface. A plurality of radially extending labyrinth seal elements are supported on the radially inner surface of the labyrinth seal holder in axially spaced relation to each other. A brush seal assembly is supported to the labyrinth seal holder downstream from the labyrinth seal elements, the brush seal assembly including a brush seal holder and a brush seal comprising seal bristles having fixed ends supported to the brush seal holder and free ends located adjacent to an axially rearward one of the rotor arms. The brush seal holder is attached to the axially facing surface of the labyrinth seal holder. A seal plate defining a detachable labyrinth seal element extends radially inward from the labyrinth seal holder to the rearward rotor arm at a location upstream of the brush seal.

The plurality of labyrinth seal elements supported on the inner surface of the labyrinth seal holder have inner ends that may be located axially aligned with a forward one of said rotor arms A distance from the inner surface of the labyrinth seal holder to an end of the labyrinth seal elements, distal from the labyrinth seal holder, may be the same for each labyrinth seal element.

The brush seal assembly may be mounted to the labyrinth seal holder by a plurality of circumferentially spaced bolts extending through the brush seal holder and the labyrinth seal holder, and the bolts may extend through holes in the seal plate to circumferentially position the seal plate The row of vanes includes a radially inner vane endwall defining a radially inner boundary for a hot gas path through the turbine and having upstream and downstream edges, the row of blades on the downstream disk includes a radially inner blade endwall having an upstream edge spaced from the downstream edge of the vane endwall an endwall gap distance, and wherein the downstream disk may have a radial face structure that extends radially outward from a location on the rearward rotor arm and faces axially toward a downstream axial face of the brush seal assembly, the radial face structure may be spaced the endwall gap distance from the downstream axial face of the brush seal assembly.

The radial face structure may include an upstream facing surface that extends radially outward from a downstream end of the rearward rotor arm, the radial face structure may include retention elements for retaining cover plates in engagement with a forward facing side of the downstream disk.

The retention elements may include bolts having bolt heads extending axially forward from the upstream facing surface, and the spacing between the radial face structure and the downstream axial face of the brush seal assembly may be a minimum axial distance measured from the downstream axial face of the brush seal assembly to the bolt heads The rotor arms defines a seal surface that is a smooth surface facing radially outward from the rotor arms, the seal surface may define a constant radial distance from a forward seal surface on the forward rotor arm to the inner surface of the labyrinth seal holder and from a rearward seal surface on the rearward rotor arm to a radially inner surface of the brush seal holder In accordance with another aspect of the invention, a seal assembly is provided for a turbine engine The turbine engine includes adjacent upstream and downstream rotating rotor disks supporting respective rows of blades, a row of stationary vanes located between the rows of blades, and axially extending forward and rearward rotor arms supported on the upstream and downstream rotor disks, respectively, and located radially inward from the blades The seal assembly comprises an annular labyrinth seal holder supported on a radially inner end of the vanes and having a radially inner surface and a downstream axially facing surface. A plurality of radially extending labyrinth seal elements are supported on the radially inner surface of the labyrinth seal holder in axially spaced relation to each other, and the labyrinth seal elements are all the same length from the inner surface of the labyrinth seal holder to an end of the labyrinth seal elements, distal from the labyrinth seal holder A brush seal assembly is supported to the labyrinth seal holder downstream from the labyrinth seal elements and has a radially inner surface, the brush seal assembly including a brush seal holder and a brush seal extending radially to the rearward rotor arm, the brush seal holder being bolted to the downstream facing surface of the labyrinth seal holder. A seal plate defining a detachable labyrinth seal element extends radially inward from the labyrinth seal holder to the rearward rotor arm at a location upstream of the brush seal, the seal plate being sandwiched between the labyrinth seal holder and the brush seal holder. The rotor arms include seal surfaces that face radially outward toward the inner surfaces of the labyrinth seal holder and the brush seal holder, the seal surfaces being smooth surfaces, extending in the axial direction, defining a constant radial distance from the seal surface on the forward and rearward rotor arms to the inner surface of the labyrinth seal holder and to the inner surface of the brush seal holder.

The plurality of labyrinth seal elements supported on the inner surface of the labyrinth seal holder has inner ends that may be located axially aligned with a forward one of said rotor arms.

The brush seal assembly may be mounted to the labyrinth seal holder by a plurality of circumferentially spaced bolts extending through the brush seal holder and the labyrinth seal holder, and the bolts may extend through holes in the seal plate to circumferentially position the seal plate The row of vanes includes a radially inner vane endwall defining a radially inner boundary for a hot gas path through the turbine and having upstream and downstream edges, the row of blades on the downstream disk includes a radially inner blade endwall having an upstream edge spaced from the downstream edge of the vane endwall an endwall gap distance, and wherein the downstream disk may have a radial face structure that extends radially outward from a location on the rearward rotor arm and faces axially toward a downstream face of the brush seal assembly, the radial face structure may be spaced the endwall gap distance from the downstream axial face of the brush seal assembly.

The radial face structure may include an upstream axially facing surface that extends radially outward from a downstream end of the rearward rotor arm, the radial face structure may include retention elements for retaining cover plates in engagement with a forward facing side of the downstream disk.

The retention elements may include bolts having bolt heads extending axially forward from the upstream facing surface, and the spacing between the radial face structure and the downstream face of the brush seal assembly may be a minimum axial distance measured from the downstream face of the brush seal assembly to the bolt heads.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

DETAILED DESCRIPTION OF THE INVENTION

In the following detailed description of the preferred embodiment, reference is made to the accompanying drawings that form a part hereof, and in which is shown by way of illustration, and not by way of limitation, a specific preferred embodiment in which the invention may be practiced. It is to be understood that other embodiments may be utilized and that changes may be made without departing from the spirit and scope of the present invention.

Figure 1:
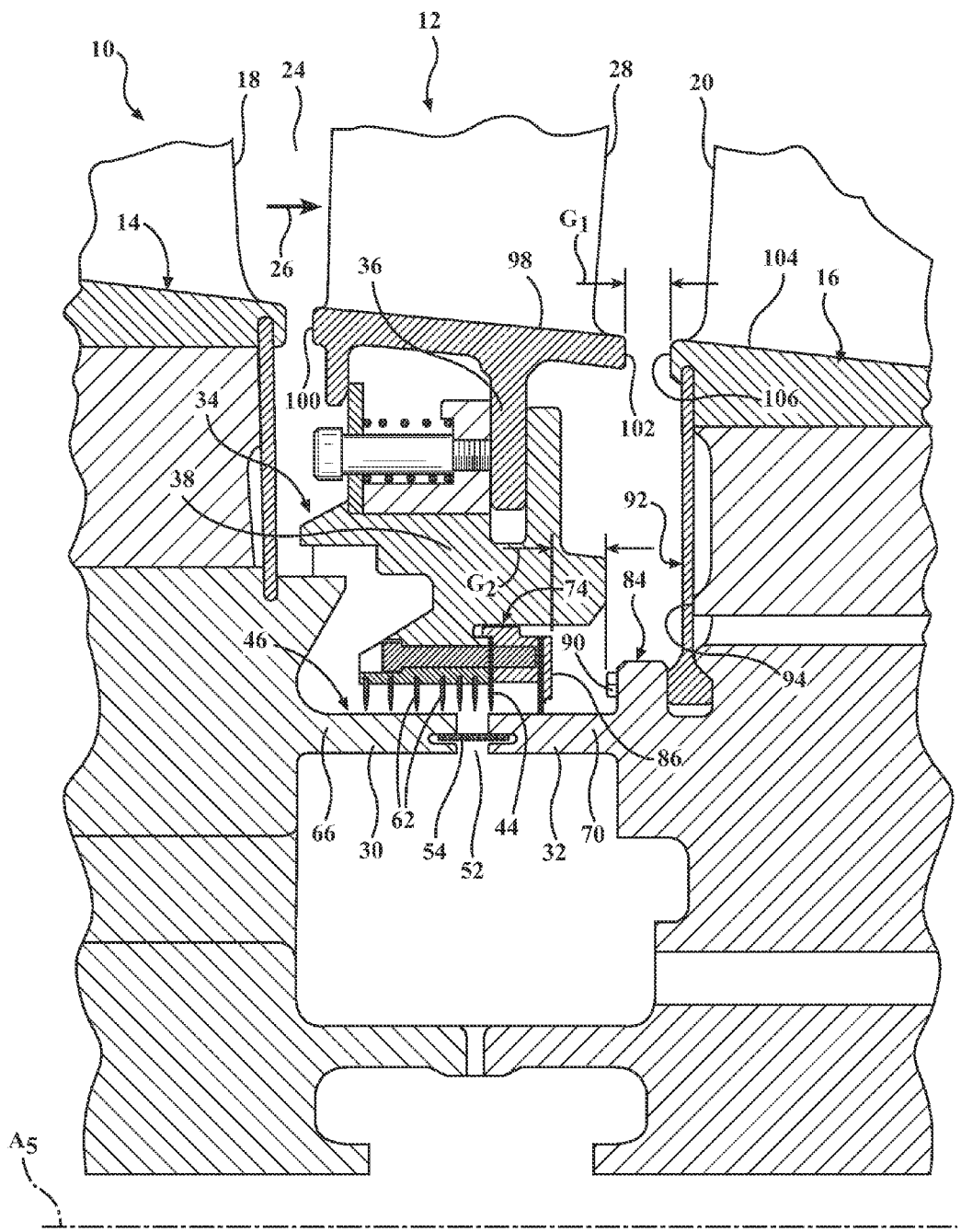
FIG. 1 is a cross-sectional side view of a portion of a turbine for a gas turbine engine incorporating the seal assembly of the present invention.

FIG. 1 illustrates a portion of a gas turbine 10 comprising a turbine section 12 and including adjacent upstream and downstream rotating rotor disks 14, 16 supporting respective rows of blades 18, 20 that are mounted circumferentially around the disks 14, 16 and extending into a hot gas flow path 22 of the engine, having a flow direction indicated by arrow 26 A row of stationary vanes 28 is located between the rows of blades 18, 20. An axially extending forward rotor arm 30 is supported on the upstream disk 14, and an axially extending rearward rotor arm 32 is supported on the downstream rotor disk 16 The forward and rearward rotor arms 30, 32 are located radially inward from the blades 18, 20.

It should be understood that the terms "upstream", "downstream", "forward" and "rearward" are used with reference the hot gas flow direction 26 through the engine. Specifically, "upstream" and "forward", as used herein, refer to an axial source or entry direction or location for the flow passing through the engine 10, and "downstream" and "rearward" refer to an axial exit direction or location for the flow passing through the engine 10. In addition, the terms "radially outer" and "radially inner" refer to a direction or location farther from or closer to, respectively, a longitudinal or rotational axis $A_S$ of the engine 10. Further, "axially facing" and "axial face" as used herein refers to a surface lying in a plane defined by intersecting radial and circumferential lines in the engine 10

Figure 2:
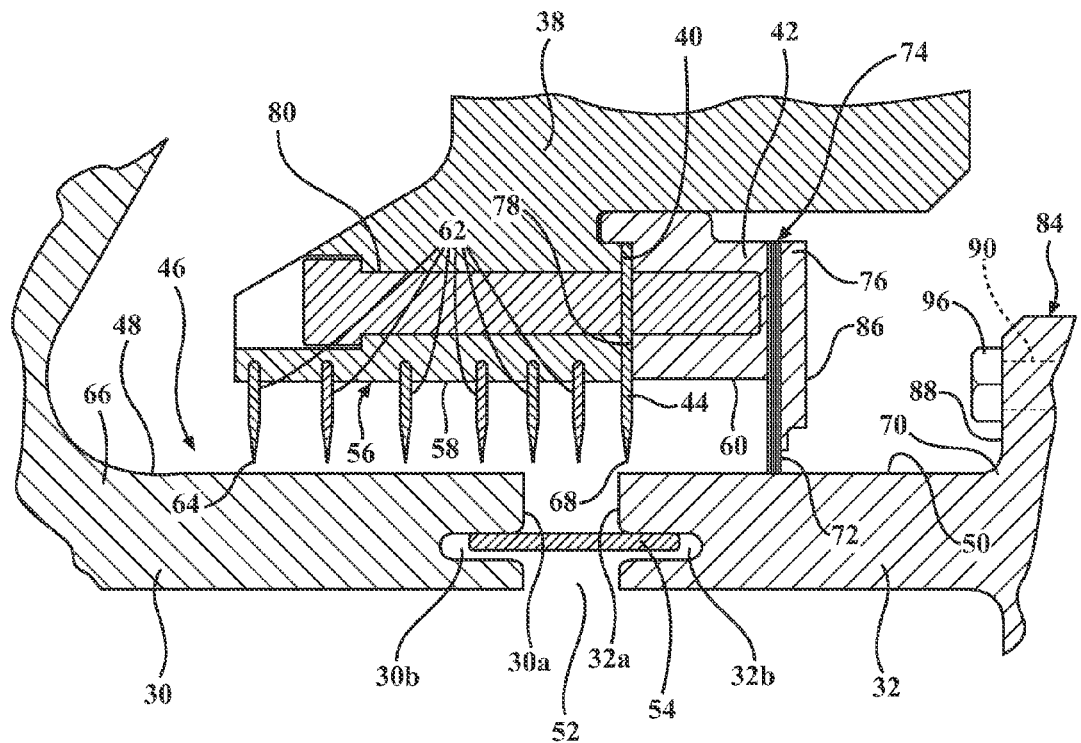
FIG. 2 is an enlarged view of the seal assembly shown in FIG. 1.

Referring to FIGS. 1 and 2, a seal assembly 34 is provided radially inward of the vanes 28 to form a seal between the vanes 28 and the disks 14, 16 The seal assembly 34 comprises an annular labyrinth seal housing or holder 38 supported on the radially inner end 36 of the vanes 28 and having a downstream axially facing surface 40. That is, the labyrinth seal holder 38 includes an annular planar face defining the surface 40 that faces in an axially downstream direction, toward the downstream disk 16 In accordance with an aspect of the invention, the axially facing surface 40 cooperates with a brush seal holder 42 to retain a seal plate 44 in position, as will be described further below It may be noted that the seal assembly 34 is provided between stationary and rotating components that may or may not be in the same stage of the turbine. In the illustrated embodiment, stationary and rotating components are associated with the third stage of the turbine including the stationary vane 28 and the rotating blade 20 associated with the downstream disk 16. However, it may be understood that the seal assembly 34 may be implemented at other locations within the engine.

A seal surface 46 of the seal assembly 34 is defined by a radially outward facing seal surface 48 on the forward rotor arm 30 and is further defined by a radially outward facing seal surface 50 on the rearward rotor arm 32. The rotor arms 30, 32 include respective ends 30a, 32a that face each other and are spaced from each other to define an axial disk gap 52 The axial disk gap 52 is sealed by a bellyband seal 54 that extends into respective slots 30b, 32b of the rotor arms 30, 32. The rotor arm ends 30a, 32a define terminal ends of the rotor arms 30, 32, and an inner surface 56 of the seal assembly 34 faces radially inward toward and is axially aligned with a portion of each of the rotor arm seal surfaces 48, 50 In particular, an inner surface 58 of the labyrinth seal holder 38 faces toward a portion of the forward rotor arm seal surface 48, as well as toward the axial disk gap 52, and an inner surface 60 of the brush seal holder 42 faces toward a portion of the rearward rotor arm seal surface 50. It may be noted that the downstream axially facing surface 40 of the labyrinth seal holder 38 is axially aligned with the location of the rearward rotor arm end 32a.

A plurality of radially extending labyrinth seal elements 62, also commonly referred to as labyrinth fingers or teeth, are supported on the radially inner surface 58 of the labyrinth seal holder 38 in axially spaced relation to each other. The seal elements 62 are rigidly attached to the labyrinth seal holder 38, such as by staking The labyrinth seal elements 62 are preferably all the same length from the inner surface 58 of the labyrinth seal holder 38 to a knife edge 64 of each of the labyrinth seal elements 62, distal from the labyrinth seal holder 38

It should be noted that the forward seal surface 48 is formed as a continuous smooth surface, i.e., without any radially extending lands, extending from the rotor arm end 30a to a forward end 66 of the forward rotor arm 30. That is, a constant radial distance is defined between the inner surface 58 of the labyrinth seal holder 38 and the forward seal surface 48 of the forward rotor arm 48 along the length of the inner surface 58.

In accordance with an aspect of the invention, it has been observed that improvements in engine design have resulted in hot gas flow pressures that can result in decreased axial clearance between the seal assembly 34 and rotating structure of the downstream disk 16 as a result of relative movement between the vanes 28 and the rotor disks 14, 16. Of particular interest for the present invention is a decreased clearance associated with relative movement between the vanes 28 comprising row 3 vanes and the blades 20 comprising row 3 blades. In analyzing damage that has occurred to labyrinth seals in engines incorporating prior seals, it is believed that contact between prior labyrinth seal elements and radial lands on the rotor arms as a result of axial movement of the labyrinth seal has been a cause of deformation and/or deterioration of the labyrinth seal elements. Hence, the current forward seal surface 48 is formed without lands and with all of the labyrinth seal elements 62 extending to a location equally spaced from the forward seal surface 48, permitting axial movement of the labyrinth seal elements 62 along the seal surface 48 without axial contact therebetween.

As noted above, the brush seal holder 42 cooperates with the labyrinth seal holder 38 to retain a seal plate 44 in position. The seal plate 44 forms an additional labyrinth seal element that is detachable and that has a knife edge 68 located adjacent to the rearward seal surface 50. The seal plate 44 extends the same radial distance inward, i e, has the same length of extension from the seal holders, 38, 42, as the seal elements 62 and is located axially aligned with the rotor arm end 32a such that the knife edge 68 is located adjacent to the rotor arm end 32a The rearward seal surface 50 is formed as a continuous smooth surface, i e, without any radially extending lands, extending from the rotor arm end 32a to a rearward end 70 of the rearward rotor arm 32. That is, a constant radial distance is defined between the inner surface 60 of the brush seal holder 42 and the rearward seal surface 50 of the rearward rotor arm 50 along the length of the inner surface 60. Hence, the seal plate 44 can move axially relative to the rearward rotor arm 32 without interfering engagement with features of the rearward rotor arm seal surface 50.

The brush holder 42 supports a brush seal 72 to define a brush seal assembly 74 The brush seal 72 is supported downstream of the labyrinth seal elements 62 and the seal plate 44, and is formed of a plurality of radially extending bristles having fixed ends located adjacent to an end plate 76 of the brush seal holder 42 and free ends located adjacent to the rearward rotor arm 32 The brush seal holder 42 is bolted to the downstream axially facing surface 40 of the labyrinth seal holder 38 In particular, a plurality of circumferentially spaced bolts 80 extend through the labyrinth seal holder 38 into threaded engagement with the brush seal holder 42 to retain the brush seal holder 42 to the labyrinth seal holder 38 with the seal plate 44 located in engagement with and sandwiched between the downstream axially facing surface 40 of the labyrinth seal holder 38 and a forward axially facing surface 78 of the brush seal holder 42.

Figure 3:
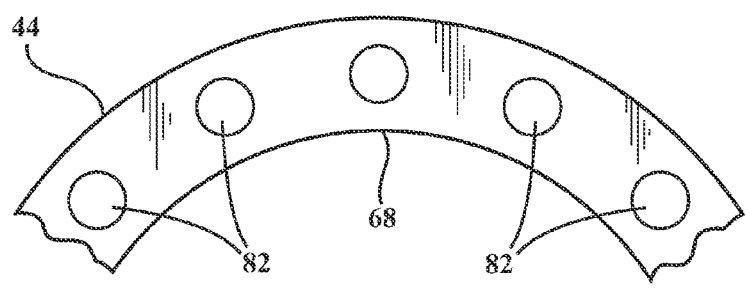
FIG. 3 is an axial view of a portion of a seal plate for the seal assembly of the present invention.

As may be seen in FIG. 3, the seal plate 44 is formed with a plurality of holes 82 for receiving respective bolts 80 (FIG. 2) to retain the seal plate against circumferential and radial movement. In addition, it may be noted that the seal plate 44 may comprise two or more arcuate segments that combine to form the circumferential seal plate 44 for cooperating with the rearward rotor arm 32 to limit passage of gases downstream to the brush seal 72. In this regard, it may be noted that while the brush seal 72 provides an efficient seal for preventing or substantially limiting passage of gas flow downstream along the rearward rotor arm 32, the force of the flow can, in the absence of at least one labyrinth seal element, cause unacceptable bending of the bristles of the brush seal 72. Accordingly, the seal plate 44 is effective to create a substantial reduction of the flow of gases against the brush seal 72 and facilitate efficient operation of the brush seal 72 In addition, in the event that the brush seal 72 is damaged, the seal plate 44 can serve as a backup to substantially limit passage of gas flow.

As may be seen in FIG. 2, the downstream disk 16 has a radial face structure 84 that extends radially outward from a location on the rearward rotor arm 32 and faces axially toward a downstream axial face 86 defined on the end plate 76 of the brush seal assembly 74. The radial face structure 84 includes an upstream facing surface 88 that extends radially outward from the downstream end 70 of the rearward rotor arm 32 The radial face structure 84 includes retention elements, such as circumferentially spaced bolts 90 that extend axially into engagement with cover plates 92 whereby the cover plates 92 are retained in engagement with a forward facing side 94 of the downstream disk 32

In accordance with an aspect of the invention, it is believed that damage to cover plate retention bolts in engines incorporating prior seals can occur as a result of axial movement of the assembly comprising the labyrinth seal holder and an associated brush seal and resulting contact with cover plate retention bolts. In accordance with aspects of the present invention, the labyrinth seal holder 38 is configured to maximize the axial spacing between the brush seal holder 42 and an axially forward surface of heads 96 of the bolts 90. The present design provides a structure for ensuring that contact between the downstream axial face 86 of the brush seal assembly 74 and the bolt heads 96 is avoided. In particular, as noted above, axial movement of the vanes 28 and associated structure of the seal assembly 34 may occur in the downstream direction. However, any axial movement of the seal assembly 34 will be limited to an endwall gap distance $G_1$ between the row of vanes 28 and the downstream row of blades 20, as seen in FIG. 1. In particular, the row of vanes 28 includes a radially inner vane endwall 98 defining a radially inner boundary for the hot gas flow path 22 through the turbine 12 and having upstream and downstream edges 100, 102 The row of blades 20 on the downstream disk 16 includes a radially inner blade endwall 104 having an upstream edge 106 spaced from the downstream edge 102 of the vane endwall 98 the endwall gap distance $G_1$ The gap distance $G_1$ defines a maximum axial distance that the vanes 28 may move, as limited by engagement between the vane endwall 98 and the blade endwall 104.

A seal face distance $G_2$ from the axially forward face of the bolt heads 96 to the downstream axial face 86 of the brush seal assembly 74 defines a minimum axial distance between the face structure 84 and the brush seal assembly 74, where it is preferable to have this distance as large as practical. The seal face distance $G_2$ is at least equal to the gap distance $G_1$ and, in a preferred embodiment, the seal face distance $G_2$ can be greater than the gap distance $G_1$ to avoid engagement of the end plate 76 with the bolt heads 96 that could cause deterioration of the bolt heads 96 during operation of the turbine.

It should be understood that the above description of the relative axial positions and distances of components of the turbine is made with reference to the locations of the components when the turbine is in a non-operating condition, and that the relative axial positions and distances of the components can change during operation of the turbine.

From the above description, it can be seen that it is preferable to form the junction between the downstream axially facing surface 40 of the labyrinth seal holder 38 and the forward axially facing surface 78 of the brush seal holder 42 in general radial alignment with the rotor end 32a in order to locate the brush seal holder 42 at a forward-most position. Hence, the seal face distance $G_2$ can be maximized, while still providing a mounting location for the seal plate 44 that locates its knife edge 68 axially aligned with the rearward rotor surface 50

While particular embodiments of the present invention have been illustrated and described, it would be obvious to those skilled in the art that various other changes and modifications can be made without departing from the spirit and scope of the invention It is therefore intended to cover in the appended claims all such changes and modifications that are within the scope of this invention

What is claimed is:

1. A seal assembly for a turbine engine including adjacent upstream and downstream rotating rotor disks supporting respective rows of blades, a row of stationary vanes located between said rows of blades, and an axially extending rotor arm supported on each said rotor disk and located radially inward from said blades, the seal assembly comprising:
an annular labyrinth seal holder supported on a radially inner end of said vanes and having a radially inner surface and a downstream axially facing surface;
a plurality of radially extending labyrinth seal elements supported on said radially inner surface of said labyrinth seal holder in axially spaced relation to each other;
a brush seal assembly supported to said labyrinth seal holder downstream from said labyrinth seal elements, said brush seal assembly including a brush seal holder and a brush seal comprising seal bristles having fixed ends supported to said brush seal holder and free ends located adjacent to an axially rearward one of said rotor arms, said brush seal holder being attached to said axially facing surface of said labyrinth seal holder; and
a seal plate defining a detachable labyrinth seal element extending radially inward from said labyrinth seal holder to said rearward rotor arm at a location upstream of said brush seal, said seal plate being sandwiched between said labyrinth seal holder and said brush seal holder;
wherein said brush seal assembly is mounted to said labyrinth seal holder by a plurality of circumferentially spaced bolts extending through said brush seal holder and said labyrinth seal holder, and said bolts extend through holes in said seal plate to circumferentially position said seal plate.

2. The seal assembly of claim 1, wherein said plurality of labyrinth seal elements supported on said inner surface of said labyrinth seal holder have inner ends located axially aligned with a forward one of said rotor arms.

3. The seal assembly of claim 2, wherein a distance from said inner surface of said labyrinth seal holder to an end of said labyrinth seal elements, distal from said labyrinth seal holder, is the same for each labyrinth seal element.

4. The seal assembly of claim 1, wherein said row of vanes includes a radially inner vane endwall defining a radially inner boundary for a hot gas path through said turbine and having upstream and downstream edges, said row of blades on said downstream disk includes a radially inner blade endwall having an upstream edge spaced from said downstream edge of said vane endwall an endwall gap distance, and wherein said downstream disk has a radial face structure that extends radially outward from a location on said rearward rotor arm and faces axially toward a downstream axial face of said brush seal assembly, said radial face structure being spaced said endwall gap distance from said downstream axial face of said brush seal assembly.

5. The seal assembly of claim 4, wherein said radial face structure includes an upstream facing surface that extends radially outward from a downstream end of said rearward rotor arm, said radial face structure including retention elements for retaining cover plates in engagement with a forward facing side of said downstream disk.

6. The seal assembly of claim 5, wherein said retention elements include bolts having bolt heads extending axially forward from said upstream facing surface, and the spacing between said radial face structure and said downstream axial face of said brush seal assembly is a minimum axial distance measured from said downstream axial face of said brush seal assembly to said bolt heads.

7. The seal assembly of claim 4, wherein said rotor arms define a seal surface that is a smooth surface facing radially outward from said rotor arms, said seal surface defining a constant radial distance from a forward seal surface on said forward rotor arm to said inner surface of said labyrinth seal holder and from a rearward seal surface on said rearward rotor arm to a radially inner surface of said brush seal holder.

8. A seal assembly for a turbine engine including adjacent upstream and downstream rotating rotor disks supporting respective rows of blades, a row of stationary vanes located between said rows of blades, and axially extending forward and rearward rotor arms supported on said upstream and downstream rotor disks, respectively, and located radially inward from said blades, the seal assembly comprising:
an annular labyrinth seal holder supported on a radially inner end of said vanes and having a radially inner surface and a downstream axially facing surface;

a plurality of radially extending labyrinth seal elements supported on said radially inner surface of said labyrinth seal holder in axially spaced relation to each other, and said labyrinth seal elements are all the same length from said inner surface of said labyrinth seal holder to an end of said labyrinth seal elements, distal from said labyrinth seal holder;

a brush seal assembly supported to said labyrinth seal holder downstream from said labyrinth seal elements and having a radially inner surface, said brush seal assembly including a brush seal holder and a brush seal extending radially to said rearward rotor arm, said brush seal holder being bolted to said downstream facing surface of said labyrinth seal holder;

a seal plate defining a detachable labyrinth seal element extending radially inward from said labyrinth seal holder to said rearward rotor arm at a location upstream of said brush seal, said seal plate being sandwiched between said labyrinth seal holder and said brush seal holder; and said rotor arms including seal surfaces that face radially outward toward said inner surfaces of said labyrinth seal holder and said brush seal holder, said seal surfaces being smooth surfaces, extending in the axial direction, defining a constant radial distance from said seal surface on said forward and rearward rotor arms to said inner surface of said labyrinth seal holder and to said inner surface of said brush seal holder;

wherein said brush seal assembly is mounted to said labyrinth seal holder by a plurality of circumferentially spaced bolts extending through said brush seal holder and said labyrinth seal holder, and said bolts extend through holes in said seal plate to circumferentially position said seal plate.

9. The seal assembly of claim 8, wherein said plurality of labyrinth seal elements supported on said inner surface of said labyrinth seal holder have inner ends located axially aligned with a forward one of said rotor arms.

10. The seal assembly of claim 8, wherein said row of vanes includes a radially inner vane endwall defining a radially inner boundary for a hot gas path through said turbine and having upstream and downstream edges, said row of blades on said downstream disk includes a radially inner blade endwall having an upstream edge spaced from said downstream edge of said vane endwall an endwall gap distance, and wherein said downstream disk has a radial face structure that extends radially outward from a location on said rearward rotor arm and faces axially toward a downstream face of said brush seal assembly, said radial face structure being spaced said endwall gap distance from said downstream axial face of said brush seal assembly.

11. The seal assembly of claim 10, wherein said radial face structure includes an upstream axially facing surface that extends radially outward from a downstream end of said rearward rotor arm, said radial face structure including retention elements for retaining cover plates in engagement with a forward facing side of said downstream disk.

12. The seal assembly of claim 11, wherein said retention elements include bolts having bolt heads extending axially forward from said upstream facing surface, and the spacing between said radial face structure and said downstream face of said brush seal assembly is a minimum axial distance measured from said downstream face of said brush seal assembly to said bolt heads.

* * * * *